June 19, 1951 G. S. ENOS 2,557,600

MEANS FOR DETERMINING THE PROPER SETTING OF MOVING-PICTURE PROJECTOR EQUIPMENT FOR MINIMUM EYE STRAIN

Filed Nov. 29, 1947 2 Sheets-Sheet 1

INVENTOR.
GEORGE S. ENOS

BY Bartlett Eyre Keel & Weymouth

ATTORNEYS

INVENTOR.
GEORGE S. ENOS
BY
Bartlett Eyre Keel & Weymouth
ATTORNEYS

Patented June 19, 1951

2,557,600

UNITED STATES PATENT OFFICE 2,557,600

MEANS FOR DETERMINING THE PROPER SETTING OF MOVING PICTURE PROJECTOR EQUIPMENT FOR MINIMUM EYE STRAIN

George S. Enos, Saint John, New Brunswick, Canada

Application November 29, 1947, Serial No. 788,800

1 Claim. (Cl. 88—16)

This invention relates to motion pictures and more particularly to means whereby greatly improved image reproduction is obtained.

In motion picture apparatus the effect of motion is produced by presenting a sequence of images to the eye, with each image varying slightly from the previous image. When these images are each presented for periods of time shorter than the normal period of retentivity of the eye, and when the light source is interrupted momentarily for shifting each successive frame or image into the projecting position, the images tend to blend one into the other to give the impression of motion.

All persons experience eye strain more or less while viewing motion pictures and I have found that this eye strain is due to an improper correlation of the movements of the shutter and the film. In one aspect my invention resides in assuring such a correlation between the shutter and the film movements that eye strain is substantially reduced if not entirely avoided.

Still another object is a novel and improved apparatus for obtaining a precise and accurate alinement of the moving parts of motion picture reproducing equipment to minimize the quantity of objectionable diffused light on the screen during projection of the picture.

Still another object of the invention is a new and improved apparatus for phasing the shutter and film in motion picture projectors to obtain substantially reduced eye strain on the part of the observer.

The above and other objects will become more apparent from the following description and referenced drawings, in which.

As pointed out, the production of motion pictures is based on the principle that the eye will retain an image for a predetermined length of time. Therefore if a series of distinct images or pictures showing only minute differences are displayed in rapid succession, the eye retains one image until the next successive image appears and the resultant blending of the several images produces the effect of motion.

To accomplish the foregoing result, it is of course necessary to correlate or phase the movement of the film carrying the successive images, with a light interrupting means or shutter so that a period of darkness exists during each time the film is transported to present the next successive image. To this end means are customarily provided on the projector so that the operator can adjust the shutter during projection of the film to compensate for backlash in the mechanical system and minor misalinement errors and present a motion picture which appears to the normal eye to be free from flicker and so called "travel ghosts."

Conventional practice in phasing or correlating the movements of the shutter and film consists merely in watching the conventional screen while shifting the phase of the shutter relative to the film movement.

I have found, however, that the foregoing conventional method of phasing motion picture shutters results in only an approximate adjustment and that by reason of such approximate phasing objectionable diffused light and "travel ghosts" are still present on the screen, although they do not appear to be visible to the naked eye. I have also found that this apparently unobservable distortion results in many instances in eye strain, since it tends to fog or blur the image in a manner not easily detectable and for which the eye attempts to compensate. With my method and apparatus I am able to obtain a precise and accurate shutter adjustment that results in the production of a clearer motion picture having greatly improved definition. Through this improvement in definition and clarity, eye strain is greatly reduced and the overall experience of the observer is rendered more pleasing and satisfying.

Figures 1, 2:
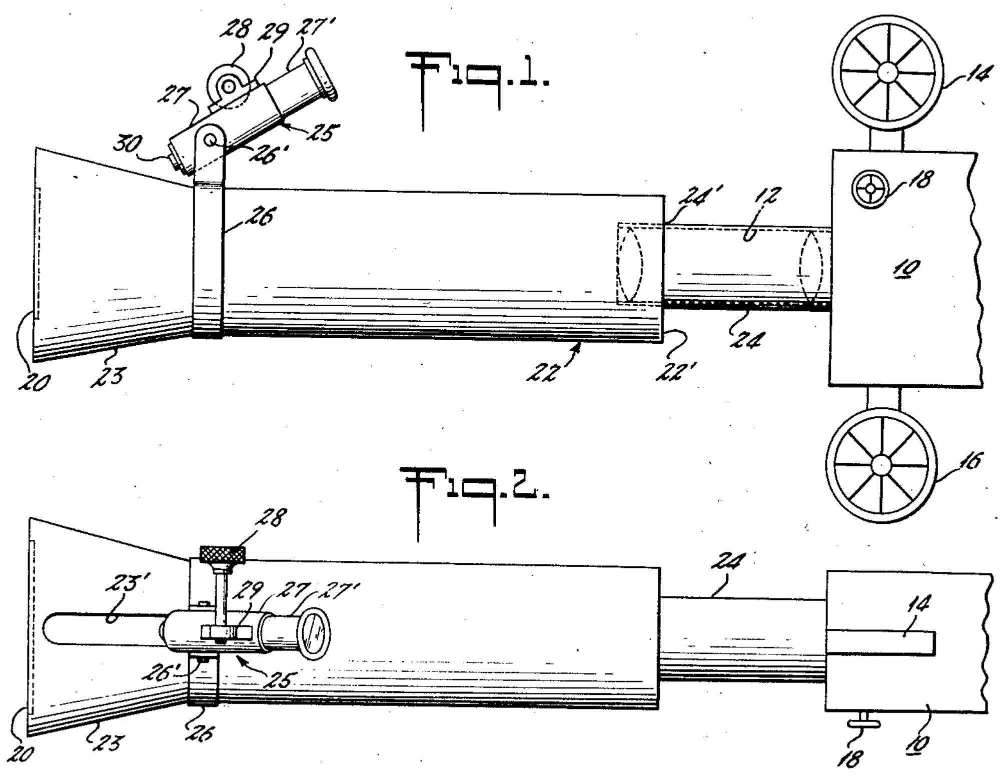
Figs. 1 to 3 are side, plan and end views, respectively, illustrating one embodiment of the invention.
Figure 3:
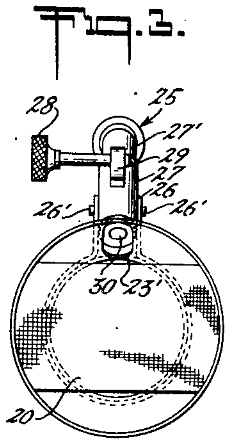

One form of apparatus for accomplishing the objects of my invention is schematically illustrated in Figs. 1 to 3. In these figures 10 denotes a conventional motion picture projector having a lens 12 and upper and lower film magazines 14 and 16. The projector may be of any conventional type having suitable means controlled by an external knob for adjusting the phase of the shutter while the machine is in operation. Such an adjustment control knob is illustrated at 18. A small screen 20 is positioned in front of the lens 12 so that a projected image of the order of 6″ x 8″ will be produced at a distance of 2′ to 3′ in front of the projector. This screen may be supported in any manner such as, for instance, by a horizontal supporting cylinder 22 having a somewhat smaller cylinder 24 slidably engaging the lens member 12 and fastened within an aperture 24′ in the rear face 22′ of the cylinder 22. In this way the distance between the projector lens and the screen can be pre-set to facilitate periodic check on the shutter adjustment. If necessary, the lens 12 on the projector can be changed in order to obtain the desired image size although it will become apparent that the image size and the distance between it and the lens can be altered through rather wide limits. I have found, however, that the use of a fairly small image at the distance set forth above produces good results. The outer end of the cylinder 22 terminates in a conical section 23 with the screen 20 being suitably supported on its outer end.

For the purpose of viewing the projected image, a magnifying glass or microscope 25 is preferably mounted on the top of the cylinder 22 and at the intersection of the cylinder 22 and the cone 23 by a circular bracket member 26 and trunnions 26′. It includes an outer cylinder 27 movable on the trunnions 26′ and an inner cylinder 27′ holding the optical system and adjustable within the cylinder 27 by the knob 28 and the rack and pinion assembly 29. The microscope or magnifying glass may either have a fairly wide field of view or be movably mounted so that the entire screen can be observed. Directly beneath the objective 30 of the microscope 25 is a slot 23′ in the conical section 23 through which the screen may be observed.

Figure 4A:
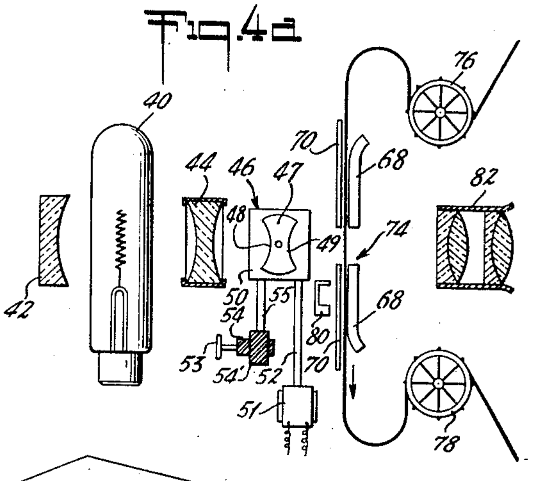
Fig. 4A is a diagrammatic view of motion picture reproducing apparatus showing one form of shutter assembly.
Figure 4B:
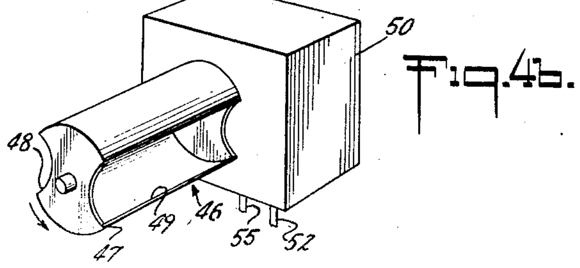
Fig. 4B is a perspective view of the shutter diagrammatically illustrated in Fig. 4A.

The conventional projector of the type illustrated in Fig. 1 is schematically shown in Fig. 4A and consists of a light source such as the lamp 40, which in theater projectors takes the form of a carbon arc, a suitable reflector 42, and a condensing lens 44. Following the condensing lens 44 is a rotary shutter 46 consisting generally of a cylindrical section having opposed openings 48 and 49 and mounted on housing 50 for rotation about its longitudinal axis. Fig. 4B illustrates more clearly the nature of the shutter shown diagrammatically in Fig. 4A. The shutter is positioned relative to the condensing lens 44 to alternately interrupt the light beam and is preferably driven by a motor 51 coupled to the shutter by a shaft 52 and a differential or similar gear train in housing 50. The phase of the shutter rotation relative to film movement is changed by rotation of the knob 53 mechanically connected with the differential gear train in housing 50 by means of worm gears 54 and 54′ and the shaft 55.

Figure 6A:
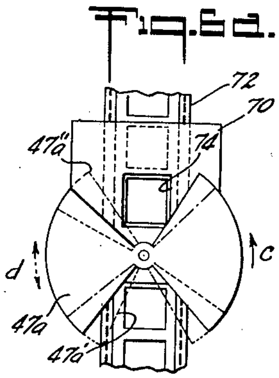
Figs. 6A and 6B are similar to Figs. 5A and 5B showing another form of shutter.
Figures 6B, 7, 8A:
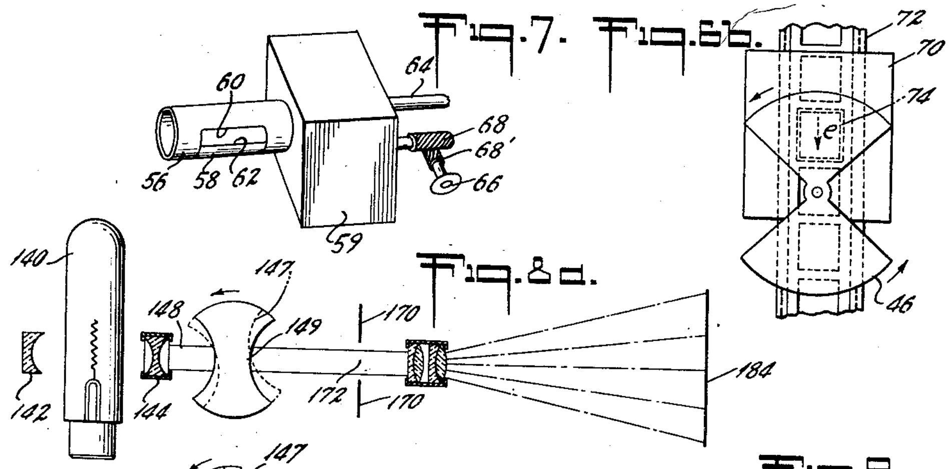
Fig. 7 is a perspective view of still another form of shutter for motion picture apparatus.
Figs. 8A to 8E are diagrammatic illustrations of several positions of a cylindrical shutter.

The invention is not intended to be limited to a particular shutter but is applicable for use with projectors having other forms such as the common disc type shutter shown in Fig. 6 or the double cylindrical shutter in Fig. 7. This latter form shutter has two concentric cylinders 56 and 58 mounted on a suitable housing 59 for opposite rotation one with respect to the other. Each cylinder 56 and 58 is provided with an elongated opening 60 and 62, respectively, which cooperates during rotation of the cylinders to periodically interrupt the light. Within the housing 59 is a differential gear train driven by means of the shaft 64 and coupled with the gears operating the cylinders 56 and 58. The differential and other gear trains are not illustrated since they may be of any conventional character and do not form part of the invention per se. In this form of shutter, as in the disc form previously described, the differential gear train can be shifted in phase by means of the knob 66, worm gears 68 and 68′ and the shaft 70 to advance or retard its phase.

Following the shutter mechanism (Fig. 4A), whether it be the disc or cylindrical type, is the film guide having front and rear elements 68 and 70, respectively, through which the film 72 is passed. These guides are arranged to form an aperture 74 in line with the light emitted from the condensing lens 44 and just large enough to accommodate a single frame on the motion picture film 72. The film is transported in a downward direction, as indicated by the arrow, by means of suitable sprockets 76 and 78 and an intermittent drive or shuttle 80. The sprockets 76 and 78 are usually driven at a constant speed while the intermittent drive or shuttle 80 is arranged to operate by means of a suitable mechanical system, not shown, to periodically engage openings on the side of the conventional film and displace the film downwardly a distance equivalent to one frame. This movement must be extremely rapid and positive so that the time required for moving the film is a fraction of the time during which the shutter interrupts the light beam. In front of the aperture 74 is positioned an objective lens 82 which receives the light passing through the film frame closing the aperture 74 and focuses the image of that frame on the screen.

In the operation of motion picture apparatus, as previously pointed out, the shutter, whether of the disc or cylindrical type, is phased or correlated with the shuttle 80. Ordinarily no adjustment is provided for the shuttle 80 and, therefore, means in the form of a differential gear train in housing 50 and the adjusting knob 53 are provided for controlling the phase or synchronization of the shutter with respect to the shuttle. For explanatory purposes, the relative positions of the film 72 and the shutter 46 are illustrated in Figs. 5A, 5B, 6A and 6B.

Figure 5A:
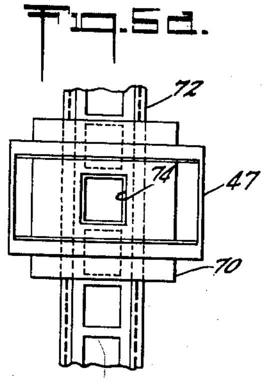
Figs. 5A and 5B illustrate generally the relationship of shutter rotation to film movement.
Figure 5B:
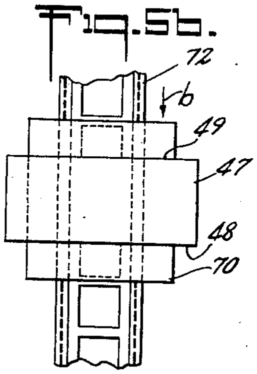

Fig. 5A shows relative positions of the shutter 47 and the film 72 when one frame of the film is being projected. In this case the openings 48 and 49 are alined. Fig. 5B shows the fully closed position of the cylindrical shutter 47 during the downward movement of the film 72 as indicated by the arrow *b*. It will be noted that the openings 48 and 49 are vertically disposed.

In Fig. 6A a disc type shutter 47*a* is illustrated in its open position. In this position, light may pass through the film frame in the aperture 74 to the objective lens 82 and thence to the screen. The solid arrow *c* illustrates the normal direction of rotation of the shutter which in this instance is counterclockwise, while the dotted arrow *d* indicates movement of the shutter to either advance or retard it in phase. The broken outline of the shutter 47*a*′ in Fig. 6A indicates the advance position of the shutter 47*a*, while the dotted outline 47*a*″ illustrates a retarded position of the shutter, these three positions of course being considered as of a given instant in time.

Fig. 6B illustrates the position of the shutter 47*a* when the film 72 is being moved in a downward direction by the shuttle 80. The aperture 74 in this instance is completely covered by the upper half of the shutter and the film 72 is indicated in the process of being moved downwardly in the direction of the arrow *e*. In actual practice, however, the shuttle 80 may not always operate to move the film downwardly each time the shutter blocks the light source but perhaps every second or third time, in order to reduce flicker. In any event, operation of the shuttle is correlated with the film as pointed out above so that movement of the film or "travel ghosts" are not apparent to the naked eye.

Present conventional practice in the phasing of shutters consists in operating the projector in the normal manner, and, while viewing the screen in its conventional position with the naked eye, turning the shutter synchronizing knob until evidence of "travel ghosts" seem to disappear. I have found that this conventional method is not satisfactory, since diffused light, which materially impairs the reproduced image, and travel ghosts are still present on the screen, and although these defects are not evident to the naked eye, they do fog or blur the image and to my knowledge are among the primary causes of eye strain.

To accomplish the objects of my invention the projector to be phased is set up in the conventional manner and the screen and magnifying means illustrated in Figs. 1 to 3 is placed in front of the projector. The projector is then operated and the lens 12 is adjusted so that a clear, sharp image appears on the small screen 20. The shutter is then synchronized or phased in the conventional way by means of the knob 18 on the projector so that the reproduced image appears to be free from flicker, travel ghosts, and other distortion.

With the projector operating, I then view the image on the screen 20 through the magnifying glass or miscoscope 25. Although the picture when viewed by the unaided eye appeared to be satisfactory, travel ghosts will be apparent and will travel upwardly or downwardly, depending upon whether the shutter is retarded or too far advanced. The shutter adjustment is then rotated very slowly in the proper direction until the travel ghosts disappear in the magnified image, whereupon a pronounced improvement in picture definition will be apparent. This improvement will also be apparent when the image is projected on the normal screen even though the original image produced by the projector when adjusted in a conventional manner seemed to be satisfactory.

As one example of the utilization of my invention I have applied the principle of it to a projector embodying a single barrel shutter and a conventional intermittent type of sprocket drive for the motion picture film. The openings on the opposite sides of the axis of the cylindrical of barrel shutter were of the conventional rectangular shape in projection and of approximately four inches in length and two and one-quarter inches depth of cord at the ends. The exposures per second were twenty-four. The projection screen employed in the projection and exhibition of the pictures was approximately five feet by seven feet. Adjustments had previously been made according to conventional practice, namely the operator would run the machine and project the picture on the exhibition screen and while doing so would make any adjustments which seemed necessary by viewing the projection screen with the naked eye.

I utilized the principle of my invention in testing and determining whether the shutter and the film movements had been properly correlated and set with respect to each other. In making this test I utilized a small screen of approximately five Inches by seven inches and supported it in a position close enough to the projector to contain the whole projected picture on this small screen.

After readjusting the objective lens to bring the small image in good focus I scanned the picture with a magnifying glass of moderate power and discovered the shutter to be very noticeably out of correlation with the film. I loosened the locking device on the shutter and advanced the setting slightly. In scanning it I saw at least three convolutions or circular rings. They seemed to be in the nature of a ripple or wave very defined in size and behavior and as I further improved the setting of the shutter, these convolutions increased in size and were carried outward to the edges of the screen. One disappeared completely. The other two were showing on the corners of the picture. This left the center part of the picture absolutely free of diffused light and stood out in bold definition.

Even when the convolutions of light or seeming convolutions of light were not observable or did not stand out in pronounced fashion, I was able to observe traveling ghosts going up or down with the shutter revolving in this case on a horizontal axis at right angles to the light beam. This indicates an improper phase relationship between the shutter and the moving film and with the particular set-up above described I found that the upwardly traveling ghosts could be obviated by advancing the shutter. If the shutter was advanced too much I found the traveling ghosts traveled downwardly instead of upwardly. In this particular instance I found that it was necessary to advance slightly the shutter. This I have attempted to illustrate diagrammatically in Figs. 8, A, B, C, D, and E, wherein I have indicated the slight advance of the shutter by dotted lines, the setting of the film drive remaining as before.

Figure 8B:
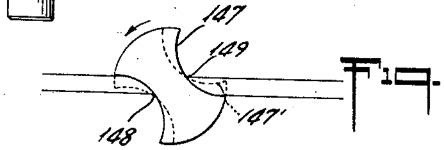
Figure 8C:
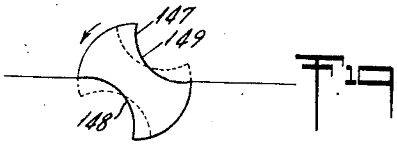
Figure 8D:
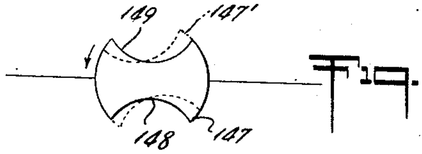
Figure 8E:
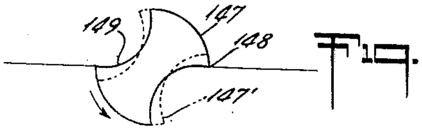

The light source indicated only in Fig. 8A includes a reflector 142, projection lamp 140 and a suitable condensing lens 144 to direct the light through the aperture 172 when the shutter 147 is in the open position as illustrated. The conventional setting of the shutter is shown in full lines with the openings 148 and 149 in alinement so that the light may pass through the shutter and the object lens 182 to the miniature screen 184. The dotted line position 147′ of the shutter 147 indicates an advanced position wherein the light is intercepted earlier with respect to the movement of the film past the aperture 172 than with the conventional shutter setting according to my experience. Fig. 8B shows the shutter 147 in the partially closed position; Fig. 8C the point of closure of the shutter; and Fig. 8D a fully closed position with the openings 148 and 149 substantially alined in a vertical plane. Fig. 8E is another view of the shutter 147 just at the point of opening. It will be noted that an angular rotation of approximately one hundred eighty degrees (180°) has been obtained and the slots or openings 148 and 149 are interposed. In each of these illustrations the advanced position of the shutter is shown which is obtained in accordance with my invention. The solid line position being, to my knowledge, the average position obtained with conventional practices.

After the correlation and setting of the shutter utilizing the principle of my invention the picture was projected and exhibited upon the large screen. The fatigue on the eyes was very substantially less in viewing the picture with the correlation and setting obtained by my invention than in the viewing of the same picture projected and exhibited prior to the application of the principle of my invention.

The miniature screen should preferably be about five by seven inches and placed from two to three feet from the objective lens. The objective lens should then be refocused if necessary to produce as sharp an image as possible on the miniature screen. The machine is then started and the picture projected on the screen. While the machine is operating, the reproduced miniature image is observed through a strong magnifying glass or microscope. I have found that a standard condensing lens system will serve to demonstrate the idea.

With the aid of the magnifying glass, it will be observed that "travel ghosts" or small streamers of light will come from the highlighted spots in the picture, such as people's hats, small bits of jewelry, decorations, candles, etc. Now the shutter correlating knob is released and the phasing of the shutter shifted in the proper direction until the "travel ghosts" disappear or are reduced to a minimum. After a few rehearsals, the operator will become familiar with the new effects produced by my invention. When the final setting is completed and the projected image stands out in bold definition, the shutter correlating knob is locked in position to retain the new setting. The small screen is then removed and the objective lens refocused on the standard exhibition screen.

Figure 9:
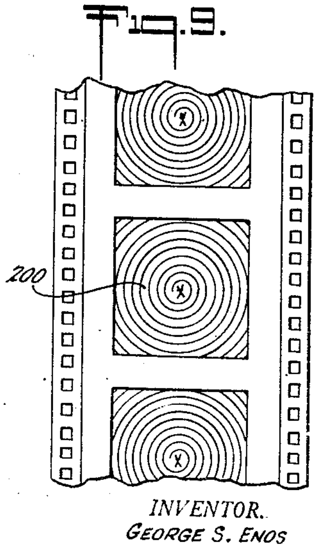
Fig. 9 is a section of a motion picture film showing one form of image adaptable for use with the invention.

I have been able to accomplish this new and improved phasing of projector shutter mechanisms by using ordinary motion picture film as a test film, although a specially prepared film would enable an operator to more quickly and easily phase the shutter according to my system. Such a film is illustrated in Fig. 9 and consists of a convolute 200 developed to cover a complete frame. At the center or origin of the convolute is placed a small *x* or other similar figure which, together with the fine lines of the convolute, enable the operator to quickly and accurately determine the position of the "travel ghosts" and other diffused light and correct the shutter phase to bring the fine lines of the convolute together with the small letter *x* into sharp definition. Although only one frame of such a film is illustrated in Fig. 9, it is apparent that each of the several frames which together form the film would have an identical image formed thereon.

While I have obtained good results by the use of the screen 20 at a distance of two to three feet in front of the projector with a projected image of the order of 6" x 8", it is understood that I do not intend to be limited thereby to such distances, size of screen, or size of projected image. The latter, of course, may be any size found suitable and the distance from the projector or objective may be any distance found convenient.

I claim:

An attachment for motion picture projectors whereby the phase of the projector shutter can be accurately correlated with the movement of the motion picture film, said attachment comprising a main cylindrical housing terminating at one end in a flared section and at its other end in a reduced cylindrical section adapted to fit over and be supported by the projector lens, a miniature screen supported on the outer end of said flared section, magnifying means pivotally mounted on said main cylindrical housing, and an opening in said conical section through which the projected image on said miniature screen can be viewed through the magnifying means.

GEORGE S. ENOS.

REFERENCES CITED

The following references are of record in the file of this patent:

UNITED STATES PATENTS

| Number | Name | Date |
|---|---|---|
| 929,678 | Lockwood | Aug. 3, 1909 |
| 1,041,345 | Porter | Oct. 15, 1912 |
| 1,385,955 | Serrurier | July 26, 1921 |
| 1,427,228 | Power | Aug. 29, 1922 |
| 1,650,479 | Woodland | Nov. 22, 1927 |
| 2,021,533 | Wolfe | Nov. 19, 1935 |
| 2,110,324 | Castle | Mar. 8, 1938 |

FOREIGN PATENTS

| Number | Country | Date |
|---|---|---|
| 485,111 | Germany | Oct. 26, 1929 |

OTHER REFERENCES

Sloan, T. O'Connor, Motion Picture Projection, Falk Publishing Co., New York, N.Y. Copyright 1922, page 271 cited. (Copy in Division 7.)